（12）United States Patent
Kamiguchi et al.

(10) Patent No.: US 11,480,941 B2
(45) Date of Patent: Oct. 25, 2022

(54) ANALYSIS DEVICE, ANALYSIS METHOD, AND NON-TRANSITORY COMPUTER READABLE MEDIUM RECORDING AN ANALYSIS PROGRAM

(71) Applicant: FANUC CORPORATION, Yamanashi (JP)

(72) Inventors: Masao Kamiguchi, Yamanashi (JP); Noboru Kurokami, Yamanashi (JP); Shinichi Ogawa, Yamanashi (JP); Yuuya Miyahara, Yamanashi (JP); Yasushi Okajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 826 days.

(21) Appl. No.: 16/396,944

(22) Filed: Apr. 29, 2019

(65) Prior Publication Data

US 2019/0369596 A1    Dec. 5, 2019

(30) Foreign Application Priority Data

May 29, 2018    (JP) .............................. JP2018-102393

(51) Int. Cl.
*G05B 19/408*    (2006.01)
*G05B 19/401*    (2006.01)
*G05B 19/4065*    (2006.01)

(52) U.S. Cl.
CPC ......... *G05B 19/408* (2013.01); *G05B 19/401* (2013.01); *G05B 19/4065* (2013.01); *G05B 2219/35086* (2013.01)

(58) Field of Classification Search
None
See application file for complete search history.

(56) References Cited

U.S. PATENT DOCUMENTS

| 6,532,555 B1* | 3/2003 | Miller ................ G05B 19/4184 700/109 |
| 2013/0338810 A1* | 12/2013 | Huang .................... H01L 22/12 700/108 |
| 2014/0222376 A1* | 8/2014 | Kao .................. G05B 19/41875 702/182 |

FOREIGN PATENT DOCUMENTS

| JP | 57-194875 | 11/1982 |
| JP | 61-14835 | 1/1986 |

(Continued)

OTHER PUBLICATIONS

Notification of Reasons for Refusal dated Aug. 4, 2020 in Japanese Patent Application No. 2018-102393.

(Continued)

*Primary Examiner* — Arleen M Vazquez
*Assistant Examiner* — Terence E Stifter, Jr.
(74) *Attorney, Agent, or Firm* — Wenderoth, Lind & Ponack, L.L.P.

(57) ABSTRACT

To provide an analysis device, an analysis method, and an analysis program capable of analyzing a machining state while associating machine data output during operation of a machine tool and measured data containing the size of an actual machined part measured by a measuring machine with each other. An analysis device comprises: a collection unit that collects an aggregate of machine data output during operation of a machine tool and an aggregate of measured data containing measurement points where the size of a machined part machined by the machine tool has been measured by a measuring instrument; and a feature extraction unit that selects machine data corresponding to an arbitrary measurement point, in the aggregate of the measured data from the aggregate of the machine data, and extracts the selected machine data as a feature at the arbitrary measurement point.

4 Claims, 11 Drawing Sheets

(56) References Cited

FOREIGN PATENT DOCUMENTS

| JP | 1-205970    | 8/1989  |
|----|-------------|---------|
| JP | 4-164550    | 6/1992  |
| JP | 8-304056    | 11/1996 |
| JP | 10-180591   | 7/1998  |
| JP | 2000-84797  | 3/2000  |
| JP | 2003-271212 | 9/2003  |
| JP | 2013-258338 | 12/2013 |
| JP | 2014-217887 | 11/2014 |

OTHER PUBLICATIONS

Notification of Reasons for Refusal dated Oct. 6, 2020 in Japanese Patent Application No. 2018-102393.

* cited by examiner

FIG. 4

| | DATE AND TIME OF INSPECTION | HUMAN FACTOR | TOOL FACTOR | JIG FACTOR | WORKPIECE FACTOR | MACHINE FACTOR | NORMAL |
|---|---|---|---|---|---|---|---|
| MACHINING NUMBER 1 | | ○ | | | | | |
| MACHINING NUMBER 2 | | | | ○ | | | |
| MACHINING NUMBER 3 | | | | | | | ○ |
| MACHINING NUMBER 4 | | | | ○ | | | |
| ... | | | | | | | |
| MACHINING NUMBER n | | ○ | | | | | |

[START ANALYSIS] [DETERMINE DEFECT]

MEASUREMENT 1: ZONE FROM (X1, Y2) TO (X1, Y3)
MEASUREMENT 2: ZONE FROM (X2, Y4) TO (X3, Y4)
MEASUREMENT 3: ZONE FROM (X4, Y3) TO (X4, Y2)
MEASUREMENT 4: ZONE FROM (X3, Y1) TO (X2, Y1)

FIG. 9

X-AXIS DATA

| MEASUREMENT POINT | TARGET POSITION | SENSOR POSITION | MOTOR POSITION | SENSOR VALUE | MOTOR SPEED COMMAND | MOTOR ACTUAL SPEED | MOTOR CURRENT COMMAND | MOTOR ACTUAL CURRENT | MOTOR LOAD TORQUE |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |

FIG. 12

| | NUMBER AND NAME OF MACHINING | MACHINING STATUS | MACHINED RATE | ABNORMALITY DETECTION |
|---|---|---|---|---|
| MACHINE TOOL 1 | P10-002/CAM | NORMAL | 80% | NO |
| MACHINE TOOL 2 | P12-105/CASE | NORMAL | 30% | NO |
| MACHINE TOOL 3 | P35-302/CAM | NORMAL | 44% | NO |
| MACHINE TOOL 4 | P45-405/LINK | NORMAL | 56% | NO |
| ⋮ | ⋮ | ⋮ | ⋮ | ⋮ |
| MACHINE TOOL n | P45-502/CAM | NORMAL | 28% | NO |

ANALYSIS DEVICE, ANALYSIS METHOD, AND NON-TRANSITORY COMPUTER READABLE MEDIUM RECORDING AN ANALYSIS PROGRAM

This application is based on and claims the benefit of priority from Japanese Patent Application No. 2018-102393, filed on 29 May 2018, the content of which is incorporated herein by reference.

BACKGROUND OF THE INVENTION

Field of the Invention

The present invention relates to a device, a method, and a non-transitory computer readable medium recording a program for analyzing a machining state.

Related Art

Various attempts have been made for reducing defects in machining. For example, patent document 1 suggests a technique of determining abnormality in machining by comparing a load torque pattern during normal machining and a load torque pattern during actual machining. Patent document 2 suggests a technique of determining abnormality in machining by generating master data from a load torque pattern and machining size data during normal machining, and comparing the master data and actual machining data.

Patent Document 1: Japanese Unexamined Patent Application, Publication No. 2000-84797
Patent Document 2: Japanese Unexamined Patent Application, Publication No. 2003-271212

SUMMARY OF THE INVENTION

Examples of a factor for defective machining include a human factor such as start of machining with erroneous setting, a tool factor due to tool wear, a workpiece factor due to a defect in a workpiece material, a jig factor due to a defect in jig fixation, a machine factor due to wear or heat deformation of a machine, for example.

For example, machining is not performed correctly in the presence of a human factor such as erroneous setting, so that the machining should be stopped immediately. Regarding a tool factor, change of a tool can be delayed until the end of machining currently performed in response to a degree of wear. On an actual factory floor of machining, minimizing damage is important by taking different actions in response to defect factors, like in the foregoing cases. While defective machining has been found by detecting a motor load torque, etc. during actual machining according to the conventional technique, it has been impossible to identify a factor for the defective machining. Additionally, conventional analysis of a machining state has not been conducted by extracting feature data about the machining state while associating measured data about an actual machined part and machine data during actual machining with each other, and analyzing the machining state based on the feature data.

The present invention is intended to provide an analysis device, an analysis method, and an analysis program capable of analyzing a machining state based on feature data about the machining state by extracting the feature data while associating measured data containing the size of an actual machined part measured by a measuring machine and machine data output during operation of a machine tool with each other.

(1) An analysis device according to the present invention ("diagnosis device 1" or "analysis device 1A" described later, for example) comprises: a collection unit (collection unit 101 described later, for example) that collects an of machine data output during operation of a machine tool (machine tool 2 described later, for example) and an aggregate of measured data containing measurement points where the size of a machined part machined by the machine tool has been measured by a measuring instrument (measuring instrument 3 described later, for example); and a measurement point feature extraction unit (feature extraction unit 102 described later, for example) that selects machine data corresponding to an arbitrary measurement point in the aggregate of the measured data from the aggregate of the machine data, and extracts the selected machine data as a feature at the arbitrary measurement point.

(2) The analysis device described in (1) may further comprise an output unit (output unit 104 described later, for example) that outputs machine data in the order of the measurement points. The machine data is about the measurement points the aggregate of the measured data selected and extracted as features at the corresponding measurement points by the feature extraction unit.

(3) The feature extraction unit described in (1) or (2) may further calculate a relationship between a machine data group as a partial or entire aggregate of the extracted machine data and a measurement point group as a partial or entire aggregate of measurement points corresponding to the machine data group based on the machine data extracted as a feature about each measurement point in the aggregate of the measured data, and define the calculated relationship as a feature quantity about the measurement point group as the partial or entire aggregate of the measurement points.

(4) An analysis method according to the present invention is an analysis method of analyzing a state of machining by a machine tool (machine tool 2 described later, for example) executed by a computer ("diagnosis device 1" or "analysis device 1A" described later, for example). The method executed by the computer comprises: a machine data collection step of collecting an aggregate of machine data output during operation of the machine tool; a measured data collection step of collecting an aggregate of measured data containing measurement points where the size of a machined part machined by the machine tool has been measured by a measuring machine (measuring instrument 3 described later, for example); and a measurement point feature extraction step of selecting machine data corresponding to an arbitrary measurement point in the aggregate of the measured data collected in the measured data collection step from the aggregate of the machine data collected in the machine data collection step, and extracting the selected machine data as a feature at the arbitrary measurement point.

(5) An analysis program according to the present invention is for causing a computer ("diagnosis device 1" or "analysis device 1A" described later, for example) to function as: a collection unit (collection unit 101 described later, for example) that collects an aggregate of machine data output during operation of the machine tool (machine tool 2 described later, for example) and an aggregate of measured data containing measurement points where the size of a machined part machined by the machine tool has been measured by a measuring machine; and a feature extraction unit (feature extraction unit 102 described later, for example) that selects machine data corresponding to an arbitrary measurement point in the aggregate of the measured data from the aggregate of the machine data, and extracts the selected machine data as a feature at the arbitrary measurement point.

The present invention can provide an analysis device, an analysis method, and an analysis program capable of analyzing a machining state based on feature data about the machining state by extracting the feature data while associating measured data containing the size of an actual machined part measured by a measuring machine and machine data output during operation of a machine tool with each other. The measuring machine is available for analyzing a machining state based on feature data about the machining state by extracting the feature data while associating measured data containing the size of an actual machined part measured by the measuring machine and machine data output during operation of the machine tool with each other.

BRIEF DESCRIPTION OF THE DRAWINGS

FIG. 4 shows an example of an input screen for an inspection result containing factors for defective machining according to the embodiment;

FIG. 9 shows an example of a data structure according to the embodiment determined when machine data extracted as a feature at a measurement point is stored;

FIG. 12 shows an example of a monitoring screen containing a diagnosis result according to the embodiment.

DETAILED DESCRIPTION OF THE INVENTION

Figure 1:
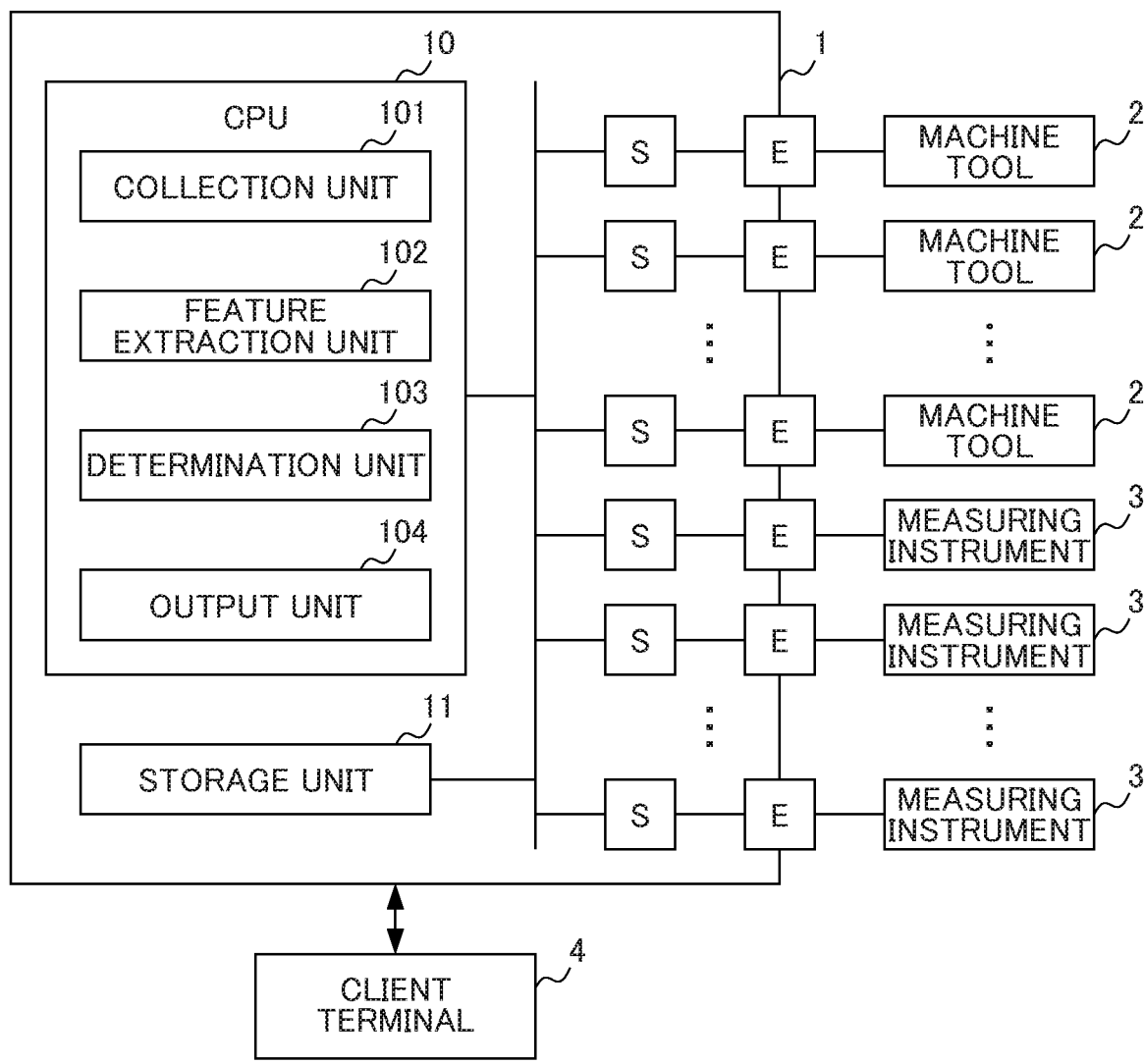
FIG. 1 is a block diagram showing the functional configuration of a diagnosis device including an analysis device according to an embodiment.

An example of an embodiment of the present invention will be described below. FIG. 1 is a block diagram showing the functional configuration of a diagnosis device 1 as an analysis device according to the embodiment. The diagnosis device 1 is connectable to at least one machine tool 2 and at least one measuring instrument 3.

The diagnosis device 1 is an information processor (computer) such as a personal computer or a server device, and includes a CPU 10 as a control unit, a storage unit 11, and various types of input/output devices and a communication interface.

For connection to the multiple machine tools 2 or multiple measuring instruments 3, the diagnosis device 1 includes a physical interface F as a signal converter conforming to a connector and electrical specifications employed in each of these machines. An electrical signal transmitted from each of the machines through the physical interface F is converted to a predetermined standard signal. For example, Ethernet (registered trademark) may be used as a normal communication standard. The physical interface E may be an external interface.

The diagnosis device 1 includes a software interface S as a data structure converter that converts the structure of data obtained from an electrical signal input through the physical interface E to a predetermined standard format. The CPU 10 may be responsible for the conversion of the data format instead of the software interface S. The data structure conversion includes a mechanism for conversion of differences between protocols such as Ethernet/IP (registered trademark), EtherCAT (registered trademark) and OPC, and a software module for adjusting unit systems of data having the same meaning or collecting data having the same meaning among data acquired through communication.

The physical interface E and the software interface S are bidirectionally convertible. The diagnosis device 1 may feed back information and a diagnosis result about machining to the machine tool 2, and the machine tool 2 may compensate for the machining in response to the diagnosis result. The measuring instrument 3 may acquire information about measurement and information about a measurement result from the diagnosis device 1, and may reflect the acquired information in a measurement method.

The CPU 10 includes a collection unit 101, a feature extraction unit 102, a determination unit 103, and an output unit 104. These functional units are realized by execution of a diagnosis program in the storage unit 11 by the CPU 10.

The collection unit 101 collects machine data from the machine tool 2 through the physical interface E and the software interface S together with sampling time. The collected machine data is data output during operation of the machine tool 2. The collection unit 101 further collects measured data from the measuring instrument 3 through the physical interface E and the software interface S. The collected measured data is data resulting from measurement of a part machined by the machine tool 2.

The feature extraction unit 102 extracts feature data indicating a feature in a machining state during generation of the machined part by the machine tool 2 based on the collected machine data during generation of the machined part by the machine tool 2 and the collected measured data about the machined part machined by the machine tool 2. Further, the feature extraction unit 102 classifies the feature data about the machining state of the machined part according to a factor for defective machining about the machined part input separately from a user, and extracts a feature quantity peculiar to the factor based on an aggregate of the feature data about the machining state classified according to the factor.

The determination unit 103 compares a feature quantity in the machine data output during actual machining by the machine tool 2 and measured data after the machining with the feature quantity according to the factor, and determines a factor for defective machining based on a degree of match.

The output unit 104 can output the machine data during generation of the machined part by the machine tool 2 and the measured data about the machined part machined by the machine tool 2 both collected by the collection unit 101, and the feature data indicating the feature in the machining state extracted by the feature extraction unit 102. Further, the output unit 104 updates and outputs a result of the determination by the determination unit 103 according to the factor together with the status of progress of the machining by the machine tool 2. The output, unit 104 may update and output results of the determinations by the determination unit 103 about the multiple machine tools 2 entirely together with the statuses of progress of the machining. The output unit 104 may transmit the output data through the communication interface of the diagnosis device 1 to a client terminal 4. The output unit 104 may present the output data on a display unit (not shown) such as a display of the diagnosis device 1.

Figure 2:
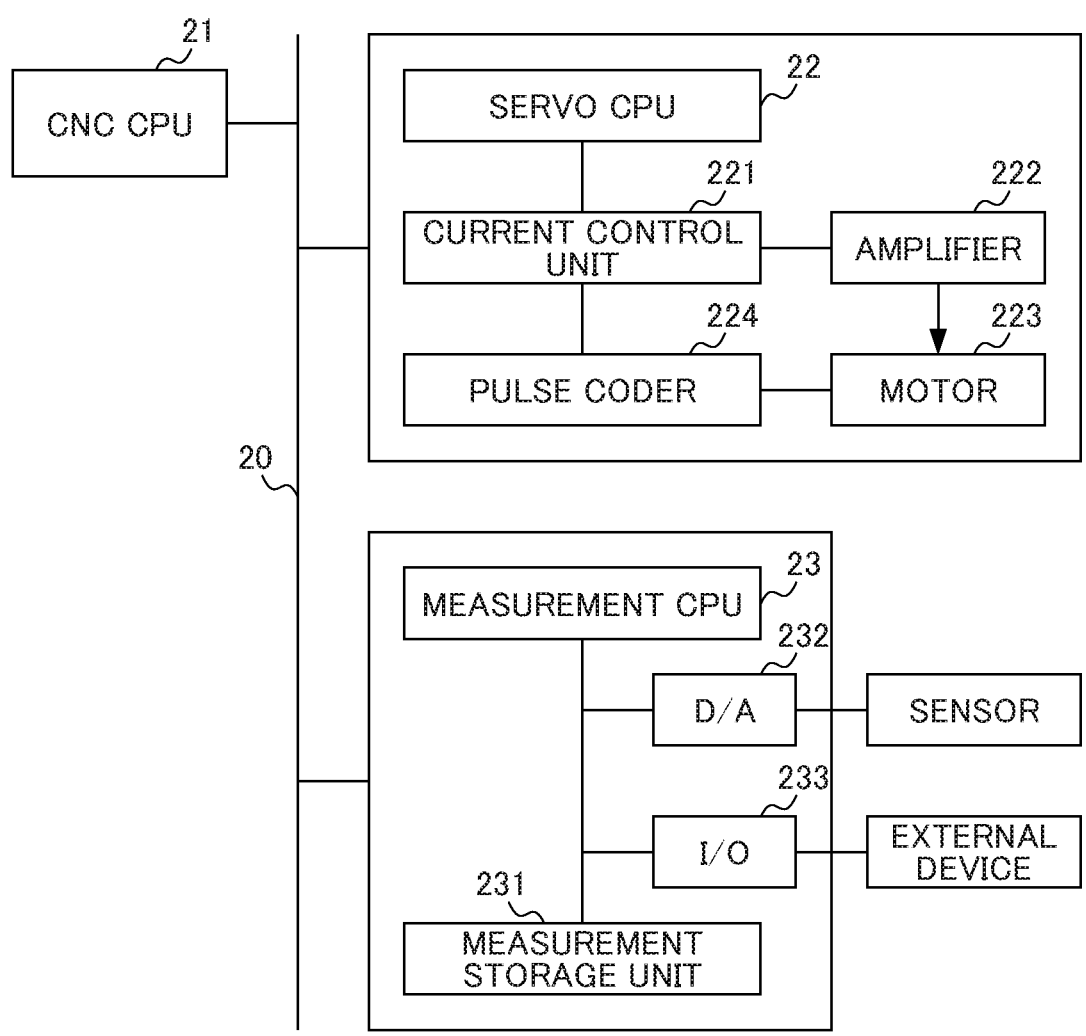
FIG. 2 is a block diagram showing the configuration of principal functions provided in a controller of a machine tool according to the embodiment.

FIG. 2 is a block diagram showing the configuration of principal functions provided in a controller of the machine tool 2 according to the embodiment. The illustration in FIG. 2 corresponds to one servo motor configuration. Meanwhile, multiple servo motor configurations are prepared in response to a purpose of machine use. Data about multiple servo motor configurations may be measured by one measurement CPU 23, or the measurement CPU 23 may be attached to each servo motor configuration. The machine tool 2 includes a computerized numerical control (CNC) CPU 21 for controlling a machining path, and a servo CPU 22. The servo CPU 22 gives a command to a current control unit 221, and controls a servo motor 223 through an amplifier 222.

The machine tool 2 includes a measurement CPU 23 that operates in the same cycle as the servo CPU 22 for data collection with intervention of a high-speed bus 20. As the measurement CPU 23 operates in the same cycle as the servo CPU 22, the measurement CPU 23 is allowed to collect position data, speed command data, current data, position feedback data measured by a pulse coder 224 provided for the motor 223, disturbance load torque data calculated by the servo CPU 22, etc. in synchronization with the operating cycle of the servo CPU 22. The collected data is accumulated in a measurement storage unit 231 together with sampling time.

The measurement CPU 23 includes a digital/analog converter 232 and an input/output interface 233. The measurement CPU 23 can capture a signal from an external sensor and information from an external device in synchronization with the operating cycle of the servo CPU 22. The functional units including the measurement CPU 23 may be provided in the controller of the machine tool 2, or may be connected as unitized functional units externally to the machine tool 2.

Figure 3:
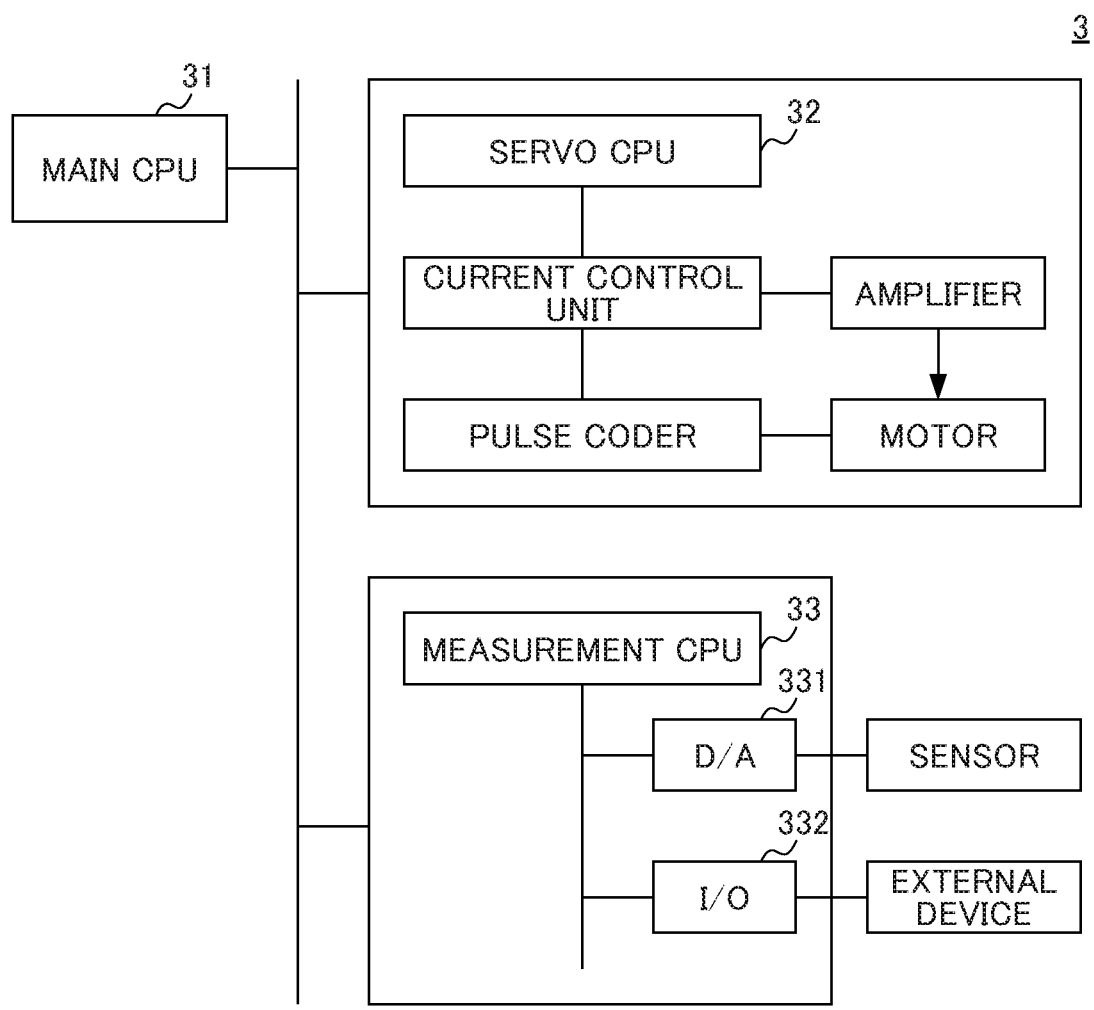
FIG. 3 is a block diagram showing the configuration of principal functions provided in a controller of a measuring instrument according to the embodiment.

FIG. 3 is a block diagram showing the configuration of principal functions provided in a controller of the measuring instrument 3 according to the embodiment. The illustration in FIG. 3 corresponds to one servo motor configuration. Meanwhile, multiple servo motor configurations are prepared in response to a purpose of machine use. Data about multiple servo motor configurations may be measured by one measurement CPU 33, or the measurement CPU 33 may be attached to each servo motor configuration. The measuring instrument 3, which may be a three-dimensional measuring instrument, includes a main CPU 31 for overall control. Like the machine tool 2, the measuring instrument 3 further includes a servo CPU 32 for controlling a mechanism to operate in space. The measuring instrument 3 includes a measurement CPU 33 for data collection. The measuring instrument 3 may further include a digital/analog converter 331 for acquisition of data from a non-contact sensor, and an input/output interface 332 for input and output to and from an external device, for example.

FIG. 4 shows an example of an input screen for an inspection result containing factors for defective machining according to the embodiment. This input screen is displayed on the diagnosis device 1 or the client terminal 4. This input screen is used for inputting a result of inspection of a machined part by an inspector using a measuring instrument, for example, at the time of end of each machining. For example, the date and time of inspection, the presence or absence of defective machining, and a factor for defective machining are input in association with each machining accomplishment identified by a machining number. The input data is linked with machine data and measured data using the machining number as a key, and then stored into the storage unit 11.

In some cases, machined parts are subjected to sampling inspection, not total inspection. In the case of sampling inspection, not only machine data corresponding to a machining accomplishment targeted for inspection but also machine data not targeted for actual inspection may be stored in association with an inspection result and measured data.

Figure 5:
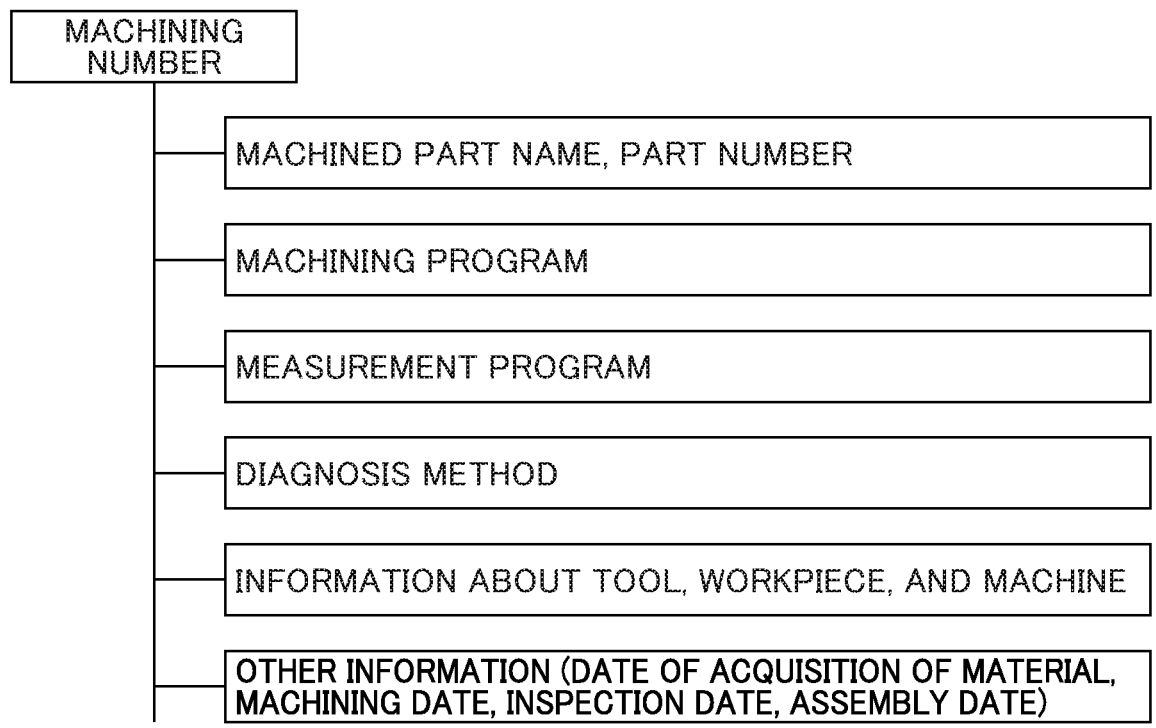
FIG. 5 shows an exemplary structure of a database stored in a storage unit according to the embodiment.

FIG. 5 shows an exemplary structure of a database stored in the storage unit 11 according to the embodiment. In the field of machining, it generally requires time to measurement and inspection after the machining to make it difficult to ensure traceability in a factory. In the embodiment, a machining number is used for identifying each machining accomplishment. In addition to being used for identifying a machining accomplishment about a part, a machining number is used in the form of an electronic tag, for example, for managing assembly after machining, managing a finished part, and managing a product after shipment.

The database contains the following information stored in linking relationship with a machining number: a machined part name and a part number, a machining program, a measurement program, a diagnosis method, information about a tool to be used, and about a workpiece and a machine, and other types of information such as a date of acquisition of a material, a machining date, an inspection date, an assembly date, etc.

An analysis function fulfilled by the feature extraction unit 102 of the diagnosis device 1 is available through an input screen on the client terminal 4. If "start analysis" on the screen is selected, for example, the feature extraction unit 102 extracts a feature quantity from data accumulated in a data area of each factor according to a factor for defective machining set by a machining number, and stores the extracted feature quantity as a feature quantity about each factor into the storage unit 11.

A defect determination function fulfilled by the determination unit 103 of the diagnosis device is available through an input screen on the client terminal 4. If "determine defect" on the screen is selected, for example, the determination unit 103 compares a feature quantity stored according to a factor for defective machining with machine data and measured data transmitted during machining and during measurement respectively, and determines a defect factor having a high degree of match. A result of this determination is transmitted to the client terminal 4 and displayed on the screen.

Factors for defective machining are classed into a human factor, a tool factor, jig factor, a workpiece factor, and a machine factor, for example. The human factor includes erroneous setting of offset data, for example. The erroneous setting of the offset data causes unintentional change in a machined amount. Hence, it becomes necessary to stop machining immediately at some positions and perform machining again after correction of the setting.

The tool factor relates to wear of a tool. If there is lack of cutting oil or if a machining speed is high, load on the tool increases to facilitate wear of the tool. If the wear of the tool is within a tolerance range of machine accuracy, action such as change of the tool can be taken before next machining. The tool factor may be determined based on the occurrence of abnormal noise or vibration during machining or poor accuracy of a machined part, for example.

The jig factor relates to defective fixation of a workpiece or trouble at a driver of a jig. The jig factor may be determined based on the occurrence of abnormal noise during machining or poor accuracy of a machined part in terms of a direction in which the jig is attached, for example.

The workpiece factor may be the presence of a blowhole in a casting, for example, and may be checked by visual inspection.

The machine factor includes wear of a ball screw of a drive axis, that of a bearing, or that of a linear guide, for example. The machine factor may be determined based on poor machine accuracy at a worn part in the direction of the drive axis.

The following describes a particular example of a method of diagnosing a feature quantity according to a factor for defective machining in machine data and measured data and diagnosing a machining status.

[Collected Machine Data]

The collection unit 101 acquires machine data about an actual operating status of the machine tool 2 in a predetermined sampling cycle together with temporal information. The machine data is motor control data about a spindle and a feed axis, for example. The machine data includes a command value and an actually measured value about a current or a voltage, a command value and an actually measured value about a position (coordinate value), position feedback data, a command value and an actually measured value about a speed, a command value and an actually measured value about a torque, etc.

[Feature Quantity Extracted from Machine Data]

For example, time-series data in a predetermined sampling period including an actually measured value about a load torque, an effective current, and an actually measured value about a position regarding a machining accomplishment determined to be defective machining is compared with time-series data including the same type of data in a normal period. A statistical value such as a maximum, a minimum, an average, or the sum of squares is extracted as a feature quantity according to a factor from an aggregate of deviations as a result of the comparison.

For example, the following feature quantities are estimated according to corresponding factors. In the case of a human factor, a deviation relating to an actually measured value about a position differs from those of the other factors. In the case of a tool factor, a deviation relating to an actually measured value about a load torque differs from those of the other factors. In the case of a jig factor, a deviation relating to an actually measured value about a position in a direction of attachment differs from those of the other factors. In the case of a workpiece factor, an actually measured value about a load torque during cutting changes momentarily in response to the size of a blowhole in a casting. In the case of a machine factor, a deviation relating to an actually measured value about a position in a direction of a drive axis differs from those of the other factors.

[Collected Measured Data]

Figure 6:
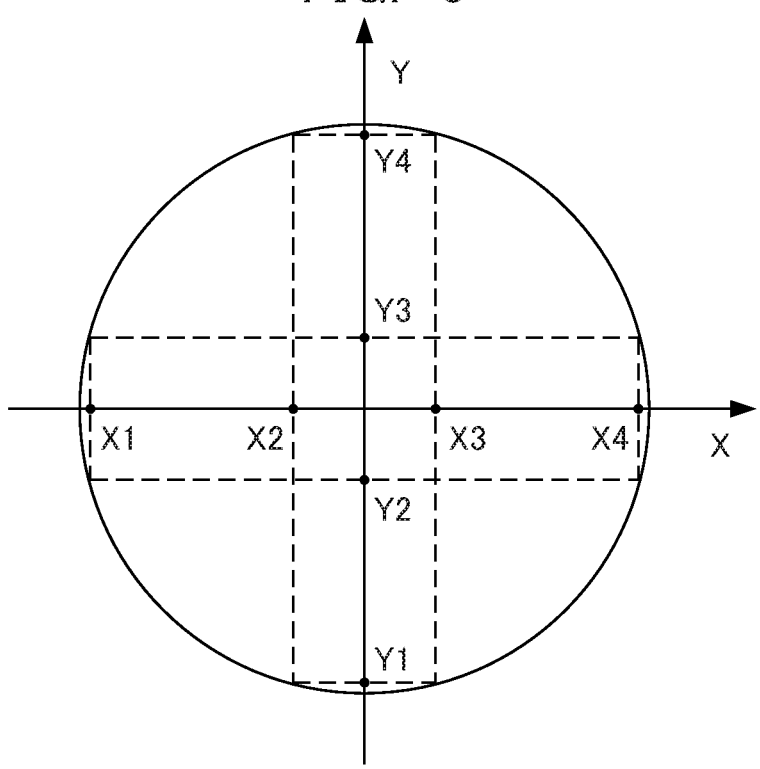
FIG. 6 shows an example of measured data used in a diagnosis method according to the embodiment.
Figure 7:
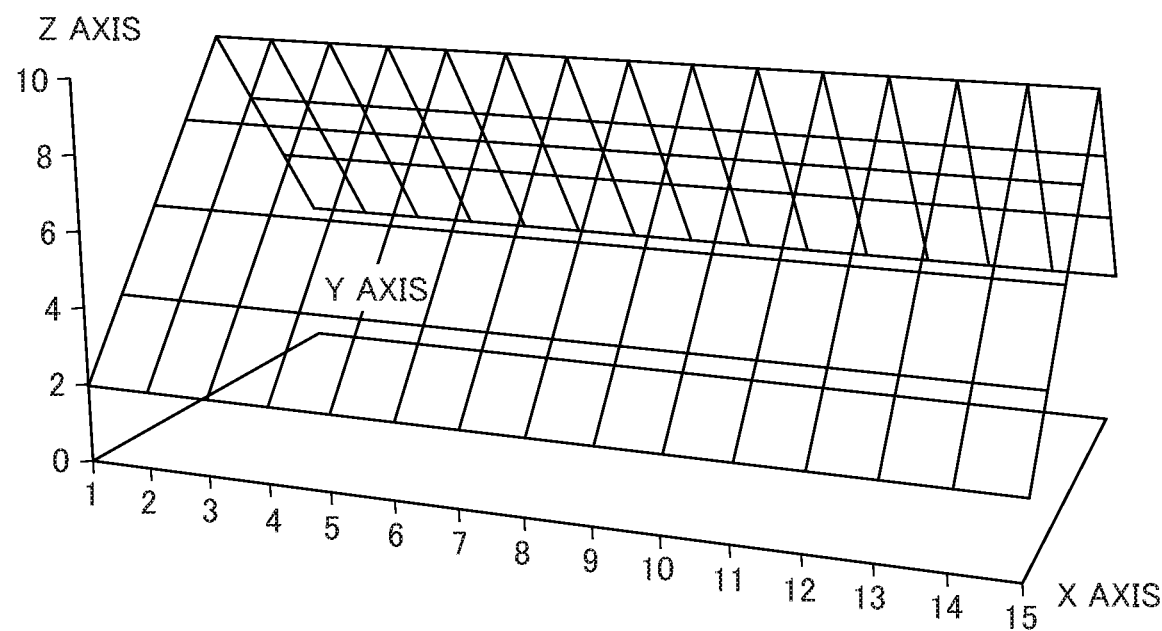
FIG. 7 shows an example of a geometry as a target shape of a machined part according to the embodiment.
Figure 8:
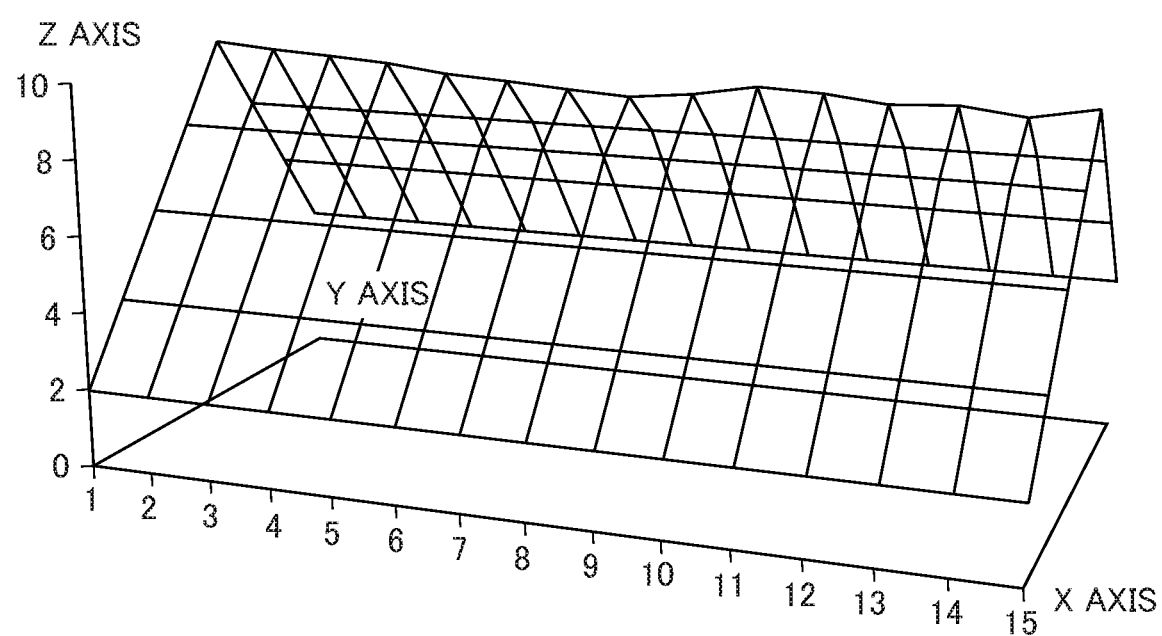
FIG. 8 shows an example of a geometry obtained by actually measuring the machined part according to the embodiment.

The collection unit 101 collects position data contained in measured data about a machining size at predetermined measurement intervals. More specifically, the collection unit 101 collects an aggregate of measured data containing measurement points where the size of a machined part machined by the machine tool 2 has been measured by the measuring instrument 3. FIG. 6 shows an example of measured data about the circularity of a part machined by the machine tool 2. A defect in the circularity includes a protrusion occurring when the rotary direction of a ball screw is reversed. For such machining, inspection along an entire circumference is not required but measurement may be made only in a zone near a position of the occurrence of the protrusion (four zones in FIG. 6, for example). By doing so, inspection time (measurement time) is shortened. FIGS. 7 and 8 each show an example of measured data about a different machined part machined by the machine tool 2. FIG. 7 shows an example of a geometry as a target shape of the machined part machined by the machine tool 2. FIG. 8 shows an example of an actual geometry obtained by the measuring instrument 3 through measurement of the size of the machined part machined by the machine tool 2. In these examples, measurement points are 15 points on an X-axis direction determined by dividing the X-axis direction equally. The points of division may be determined more finely or more coarsely in response to accuracy requested for a machined part.

Figure 10:
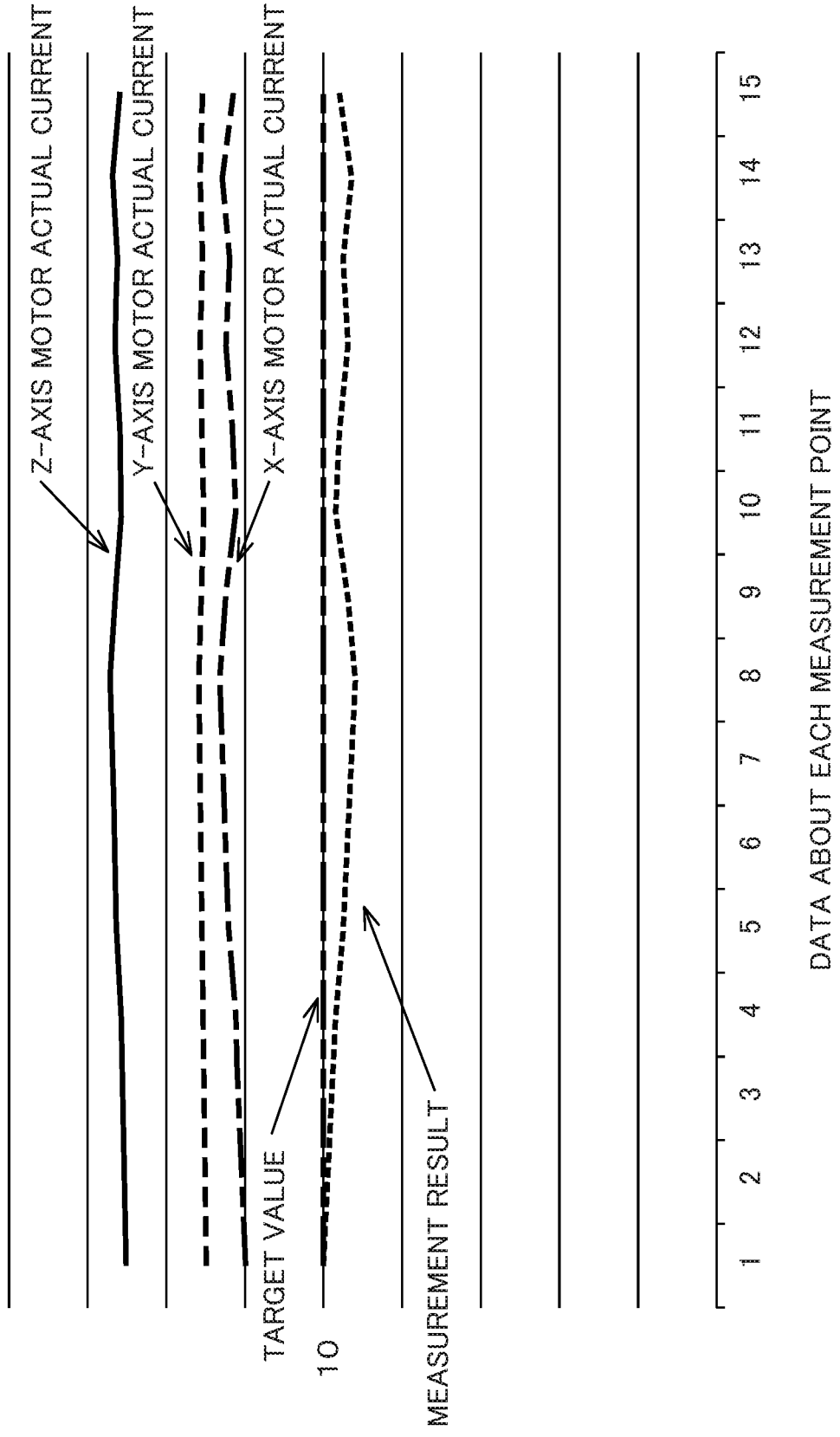
FIG. 10 shows an example of a graph about machine data according to the embodiment extracted as features at measurement points plotted in the order of the measurement points.

A measurement point where the size of a machined part machined by the machine tool 2 has been measured by the measuring instrument 3 can be associated with machine data in each sampling time during machining of this machined part using actually measured values or representative values (such as command values or theoretical values) about the position of the measurement point and a position of the machine data, for example. More specifically, the feature extraction unit 102 selects machine data corresponding to a measurement point where an actual machined part has been measured by the measuring instrument 3 from an aggregate of the collected machine data, and extracts the selected machine data as a feature at this measurement point. To achieve this, in response to a difference between a machining start zero point and a zero point where the measuring instrument 3 is to start measurement, the feature extraction unit 102 first aligns the zero points to associate a machine coordinate system at the machine tool 2 and a measurement coordinate system at the measuring instrument 2 with each other. By doing so, the feature extraction unit 102 becomes capable of comparing position data on the machine side corresponding to each sampling and a measurement point. The feature extraction unit 102 searches for position data about a motor on the machine side obtained through sampling during machining and corresponding to a measurement point generated by selecting a representative point on an actual machined part. The feature extraction unit 102 can compare the position data on the machine side corresponding to each sampling and the measurement point, select position data on the machine side corresponding to each sampling and closest to the measurement point, and extract machine data belonging to the selected position data as a feature at this measurement point. By doing so, the feature extraction unit 102 becomes capable of establishing association with machine data during machining by the machine tool 2 at each measurement point such as a target position (a geometric position planned at a design stage), a sensor position, a motor position indicated by a pulse coder of a motor, a sensor value defined when a detection sensor at a point determines that this point is a measurement point, a speed command for the motor, an actual speed of the motor, a current command for the motor, an actual current value at the motor, a torque command value for the motor, an actually measured torque value about the motor, etc. Specifically, data about the machine such as a speed or a current measured at a measurement position on the machine side can be used as basic data indicating a feature at a corresponding measurement point. The basic data may be any sampling data with respect to the measurement point and may be subjected to processing such as averaging. FIG. 9 shows an example of a data structure (record layout) determined when machine data extracted as a feature at a measurement point is stored into the storage unit 11. As shown in FIG. 9, the following data is stored in association with position information about each measurement point: a target position (a geometric position planned at a design stage), a sensor position, a motor position indicated by the pulse coder of the motor, a sensor value defined when the detection sensor at a point determines that this point is a measurement point, a speed command for the motor, etc. The stored data is used as feature data about each measurement point for subsequent analysis. As described above, the output unit 104 outputs feature data about corresponding measurement points in an aggregate of measured data in the order of the measurement points. This makes it possible to easily check the state of the machine tool 2 at each measurement point. FIG. 10 shows an example of feature data about corresponding measurement points output in the order of the measurement points in the form of a graph. FIG. 10 shows feature data about each measurement point shown in FIG. 9 in the form a graph such as a target position, a measurement result, and an X-axis motor actual current, for example, to visualize a feature of the machine tool 2 at each measurement point. This realizes observation of a deviation at a measurement point on an actual machined part from the target position and a value such as an X-axis motor actual current on the occurrence of the deviation, making it possible to easily grasp a feature on the occurrence of defective machining, for example. The feature data about each measurement point displayed in the form a graph is not limited to a target position, a measurement result, or an X-axis motor actual current. Data to be displayed may include each piece of machine data output from the measuring instrument 3 or the machine tool 2. As described above, position information pieces synchronized in a predetermined measurement zone are acquired both from the machine data and the measured data.

[Feature Quantity Extracted from Measured Data]

For example, position data in measured data about a machining size in each predetermined measurement interval regarding a machining accomplishment determined to be defective machining is compared with a representative value (a theoretical value, an average, or a center value of tolerance, for example) of position data including the same type of data in a normal period. A statistical value such as a maximum, a minimum, an average, or the sum of squares is extracted as a feature quantity according to a factor from an aggregate of deviations as a result of the comparison.

[Combined Feature Quantity]

As described above, the machine data and the measured data are associated with each other, position data on the machine side corresponding to each sampling and closest to each measurement point is selected, and machine data (a sensor position, a motor position indicated by the pulse coder of the motor, a sensor value defined when the detection sensor at a point determines that this point is a measurement point, a speed command for the motor, an actual speed of the motor, a current command for the motor, an actual current value at the motor, a torque command value for the motor, an actually measured torque value about the motor, etc.) belonging to the selected position data is extracted as feature data about the measurement point. This allows the feature extraction unit 102 to calculate a relationship between a machine data group as a partial or entire aggregate of the extracted machine data and a measurement point group as a partial or entire aggregate of measured data corresponding to the machine data group based on feature data about each measurement point generated by selecting a representative point on an actual machined part, and defines the calculated relationship as a feature quantity about some or all of measurement points. More specifically, the feature extraction unit 102 can use feature data about these measurement points as continuous data about corresponding measurement points for calculation of distribution or correlation, for example. Further, the feature extraction unit 102 can use association with two or more pieces of data in the feature data as a feature quantity about the corresponding measurement points. Still further, the feature extraction unit 102 can use feature data about these measurement points as continuous data about corresponding measurement points, calculate association between changes in data about the corresponding measurement points by means of principal component analysis, and use the calculated association as a feature quantity about the corresponding measurement points. For example, measured data is defined as a first principal component. In this case, changes in data to become second, third, . . . , n-th principal components may be determined as feature quantities. Alternatively, a feature quantity may be tendency of change from a center value (upward tendency or downward tendency) or a natural frequency obtained from the fast Fourier transform (FFT) for example. As described above, a defect factor is analyzed in factor space defined by the motion of data about a measurement point and the motion of the machine data as the feature data. By doing so, factor space indicating a feature quantity according to the defect factor can be acquired. A factor for defective machining is determined based on a degree of match between such a feature quantity according to a defect factor and a feature quantity calculated from machine data acquired during machining and/or measured data acquired after the machining.

[Method of Diagnosing Machining Status]

A threshold for an extracted feature quantity is set according to a factor for defective machining, for example. If a statistical value exceeding or falling below the set threshold is obtained from machine data acquired during machining and/or from measured data acquired after the machining, the determination unit 103 determines that a machining status is abnormal and defective machining has occurred, and determines a factor for the defective machining.

Figure 11:
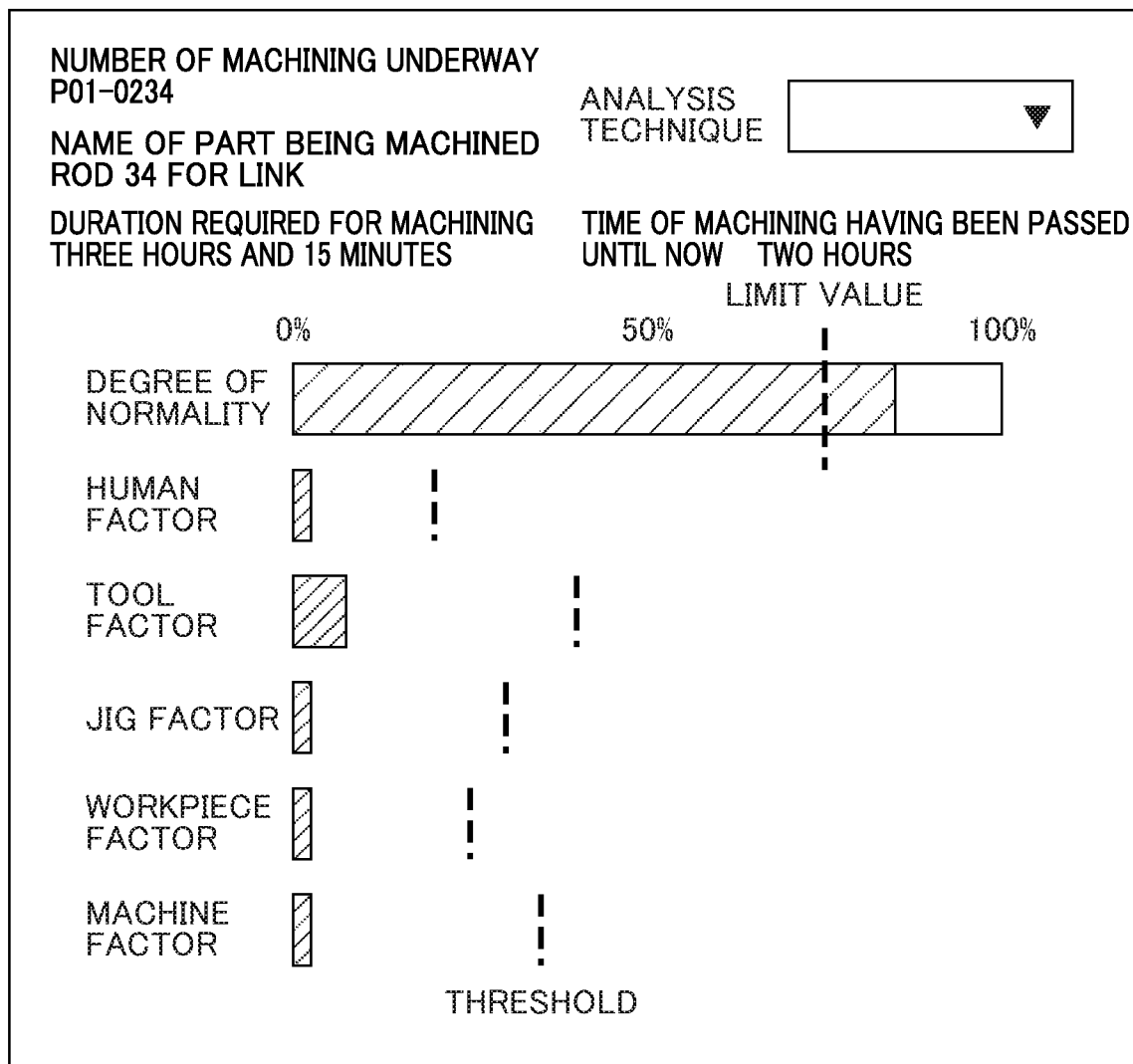
FIG. 11 shows an example of a display screen for a diagnosis result according to the embodiment.

FIG. 11 shows an example of a display screen for a diagnosis result according to the embodiment. In this example, the name of a part being machined, a duration required for machining, and time of the machining having been passed until now are displayed together with a machining number. Further, a degree of normality and a determination status according to a factor for defective machining are displayed as a current result of diagnosis.

A degree of normality shows a ratio of parts having been machined normally without being determined to result from defective machining relative to entire machining accomplishments, or a ratio of the number of times when determinations as being normal have been made during an analysis period. A limit value is set for this degree of normality. If the degree of normality falls below the limit value, a warning is output.

A determination status according to a factor shows a ratio of parts determined to result from defective machining, or a ratio of the number of times when determinations as being defective have been made during an analysis period. A threshold common to factors or a threshold for each factor is set for this determination status according to a factor. If the determination status exceeds the threshold, a warning is output.

A technique of analyzing defective machining may be selected. For example, the analysis technique is selected from options "1. Principal component analysis, 2. FET, 3. Tendency analysis, and 4. Combination." If the combination is selected, the diagnosis device 1 accepts designation of numbers such as "1+2+3," and displays a result obtained by each analysis technique or a result obtained by combining multiple analysis techniques.

FIG. 12 shows an example of a monitoring screen containing a diagnosis result according to the embodiment. In this example, the following items are displayed in relation to each of the machine tools 2 in an entire factory: the number and name of machining, a machining status indicating whether the machining proceeds normally, a progress rate of the machining, and the presence or absence of abnormality detection. Display items are not limited to these. Various types of data in addition to the diagnosis result illustrated in FIG. 11 can be displayed.

According to the embodiment, the diagnosis device 1 (feature extraction unit 102) as the analysis device selects machine data corresponding to an arbitrary measurement point in an aggregate of measured data resulting from measurement by the measuring instrument 3 from an aggregate of machine data collected by the collection unit 101, and extracts the selected machine data as a feature at the arbitrary measurement point. By doing so, a cause for defective machining is found easily based on association between an actual machined part and machine data during machining.

The diagnosis device 1 (output unit 104) as the analysis device outputs machine data in the order of measurement points (in the form of a graph, for example). The output machine data is about the measurement points in the aggregate of the measured data extracted as features at the corresponding measurement points. This makes it possible to visualize a relationship between the measured data resulting from measurement by the measuring instrument 3 and the machine data during the machining.

The diagnosis device 1 (feature extraction unit 102) as the analysis device calculates a relationship between a machine data group as a partial or entire aggregate of the extracted machine data and a measurement point group as a partial or entire aggregate of measurement points corresponding to the machine data group based on the machine data extracted as a feature about a measurement point, and defines the calculated relationship as a feature quantity about the measurement point group as the partial or entire aggregate of the measurement points. By doing so, a cause for defective machining is found easily based on association between an actual machined part and the machine data during the machining.

While the embodiment of the present invention has been described above, the present invention should not be limited to the foregoing embodiment. The effects described in the embodiment are merely a list of the most preferable effects resulting from the present invention. Effects achieved by the present invention should not be limited to those described in the embodiment.

The diagnosis device 1 may be connected to the multiple machine tools 2 and the multiple measuring instruments 3 through a network. The functional units of the diagnosis device 1 such as the feature extraction unit 102 or the determination unit 103 may be distributed to multiple devices on the network. For example, some of the functions of the collection unit 101, the feature extraction unit 102, and the output unit 104 of the diagnosis device 1 (the function of outputting machine data during generation of a machined part by the machine tool 2, outputting measured data about the machined part machined by the machine tool 2, and outputting feature data indicating a feature in a machining state extracted by the feature extraction unit 102) may be fulfilled by an analysis device 1A (not shown). In this case, the analysis device 1A is included in the diagnosis device 1. Alternatively, the analysis device 1A may be provided separately from the diagnosis device 1. The analysis function fulfilled by the feature extraction unit 102 and the determination unit 103 may include multiple analysis functions responsive to analysis techniques, and may be distributed to multiple devices. In this case, the multiple analysis functions are used selectively, and an analysis result is provided to the client terminal 4.

An analysis method executed by the diagnosis device 1 or the analysis device 1A is realized by software. To realize the diagnosis method by software, programs constituting the software are installed on a computer (diagnosis device 1). These programs may be stored in a removable medium and distributed to a user. Alternatively, these programs may be distributed by being downloaded to a computer of the user through a network.

EXPLANATION OF REFERENCE NUMERALS

E Physical interface (signal converter)
S Software interface (data structure converter)
1 Diagnosis device
2 Machine tool
3 Measuring instrument
4 Client terminal
10 CPU
11 Storage unit
101 Collection unit
102 Feature extraction unit
103 Determination unit
104 Output unit

What is claimed is:
1. An analysis device comprising:
a collection unit that collects (i) an aggregate of machine data output during operation of a machine tool and (ii) an aggregate of measured data including measurement points where the size of a machined part machined by the machine tool has been measured by a measuring machine; and
a feature extraction unit that, for each of the measurement points, (i) selects machine data corresponding to the measurement point from the aggregate of the machine data and (ii) extracts the selected machine data as extracted machine data for the measurement point,
wherein the feature extraction unit calculates a plurality of feature quantities, each of the plurality of feature quantities being calculated based on a relationship between (i) a partial aggregate of the extracted machine data for each of the measurement points and (ii) measured data including measurement points corresponding to the partial aggregate of the machine data, and
wherein the analysis device further comprises:
a determination unit that determines a factor for defective machining based on the plurality of feature quantities and thresholds individually set for each of the plurality of feature quantities; and an output unit that outputs the determined factor for defective machining to a client terminal.

2. The analysis device according to claim 1, wherein the output unit outputs the extracted machine data for each of the measurement points in the order of the measurement points.

3. An analysis method of analyzing a state of machining by a machine tool executed by a computer, the method executed by the computer comprising:
- a machine data collection step of collecting an aggregate of machine data output during operation of the machine tool;
- a measured data collection step of collecting an aggregate of measured data including measurement points where the size of a machined part machined by the machine tool has been measured by a measuring machine;
- a feature extraction step of, for each of the measurement points, (i) selecting machine data corresponding to the measurement point from the aggregate of the machine data and (ii) extracting the selected machine data as extracted machine data for the measurement point,
- wherein the feature extraction step includes calculating a plurality of feature quantities, each of the plurality of feature quantities being calculated based on a relationship between (i) a partial aggregate of the extracted machine data for each of the measurement points and (ii) measured data including measurement points corresponding to the partial aggregate of the machine data, and
- wherein the analysis method further comprises:
  - a determination step of determining a factor for defective machining based on the plurality of feature quantities and thresholds individually set for each of the plurality of feature quantities; and
  - an output step of outputting the determined factor for defective machining to a client terminal.

4. A non-transitory computer readable medium recording an analysis program for causing a computer to function as:
- a collection unit that collects (i) an aggregate of machine data output during operation of a machine tool and (ii) an aggregate of measured data including measurement points where the size of a machined part machined by the machine tool has been measured by a measuring machine; and
- a feature extraction unit that, for each of the measurement points, (i) selects machine data corresponding to the measurement point from the aggregate of the machine data and (ii) extracts the selected machine data as extracted machine data for the measurement point,
- wherein the feature extraction unit calculates a plurality of feature quantities, each of the plurality of feature quantities being calculated based on a relationship between (i) a partial aggregate of the extracted machine data for each of the measurement points and (ii) measured data including measurement points corresponding to the partial aggregate of the machine data, and
- wherein the analysis program further causes the computer to function as:
  - a determination unit that determines a factor for defective machining based on the plurality of feature quantities and thresholds individually set for each of the plurality of feature quantities; and
  - an output unit that outputs the determined factor for defective machining to a client terminal.

* * * * *